May 30, 1933. K. E. PEILER 1,911,529
APPARATUS FOR FEEDING MOLTEN GLASS.
Filed March 14, 1922 2 Sheets-Sheet 1
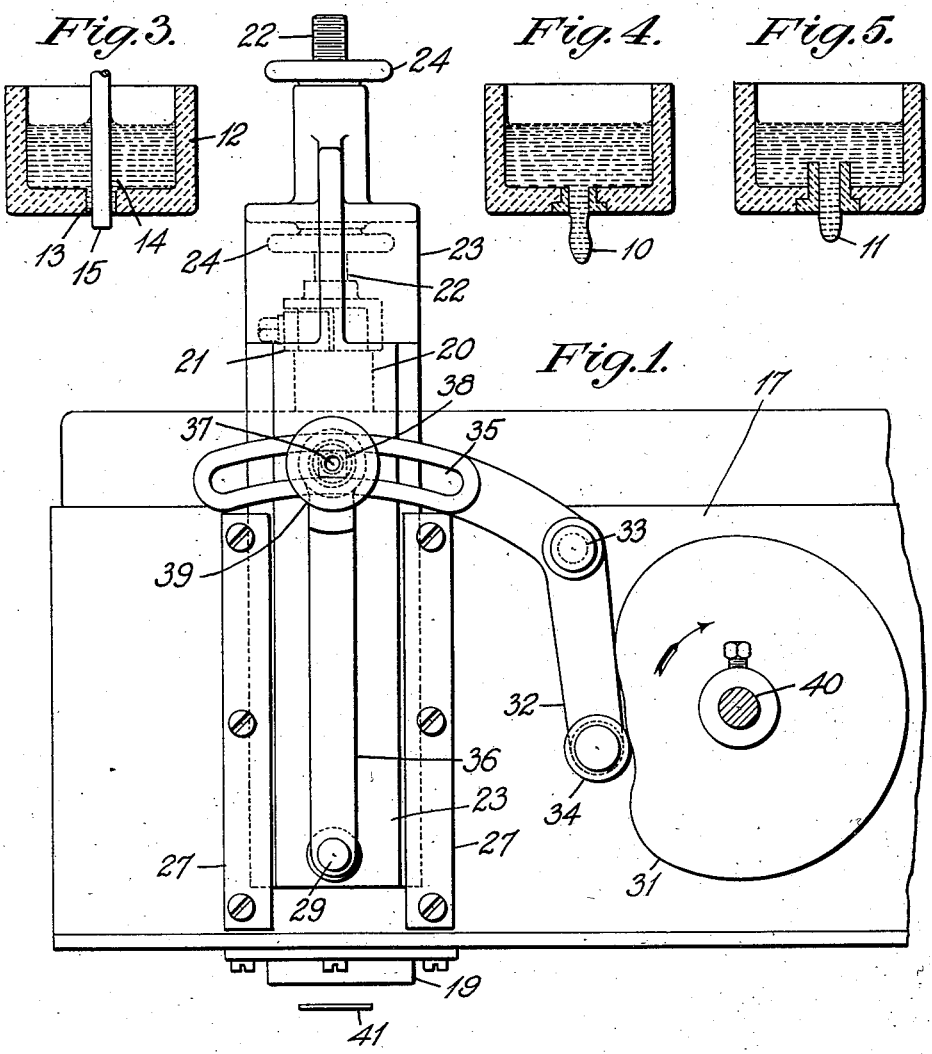
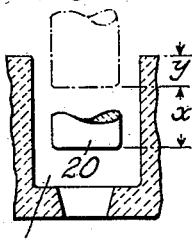 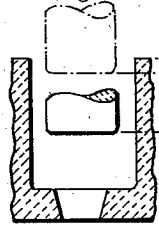 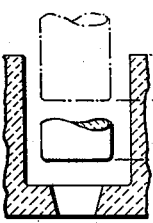 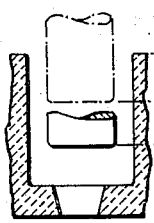 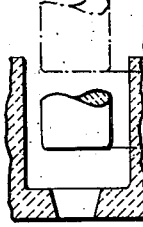
Inventor:
Karl E. Peiler
by
Atty.

May 30, 1933.   K. E. PEILER   1,911,529
APPARATUS FOR FEEDING MOLTEN GLASS
Filed March 14, 1922   2 Sheets-Sheet 2
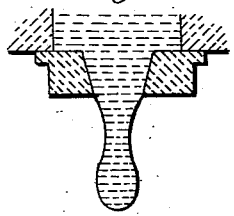
Fig.11.
Fig.12.
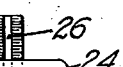
Fig.2.
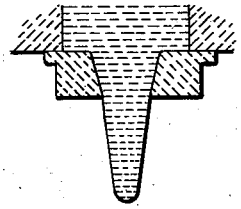
Fig.13.
Fig.14.
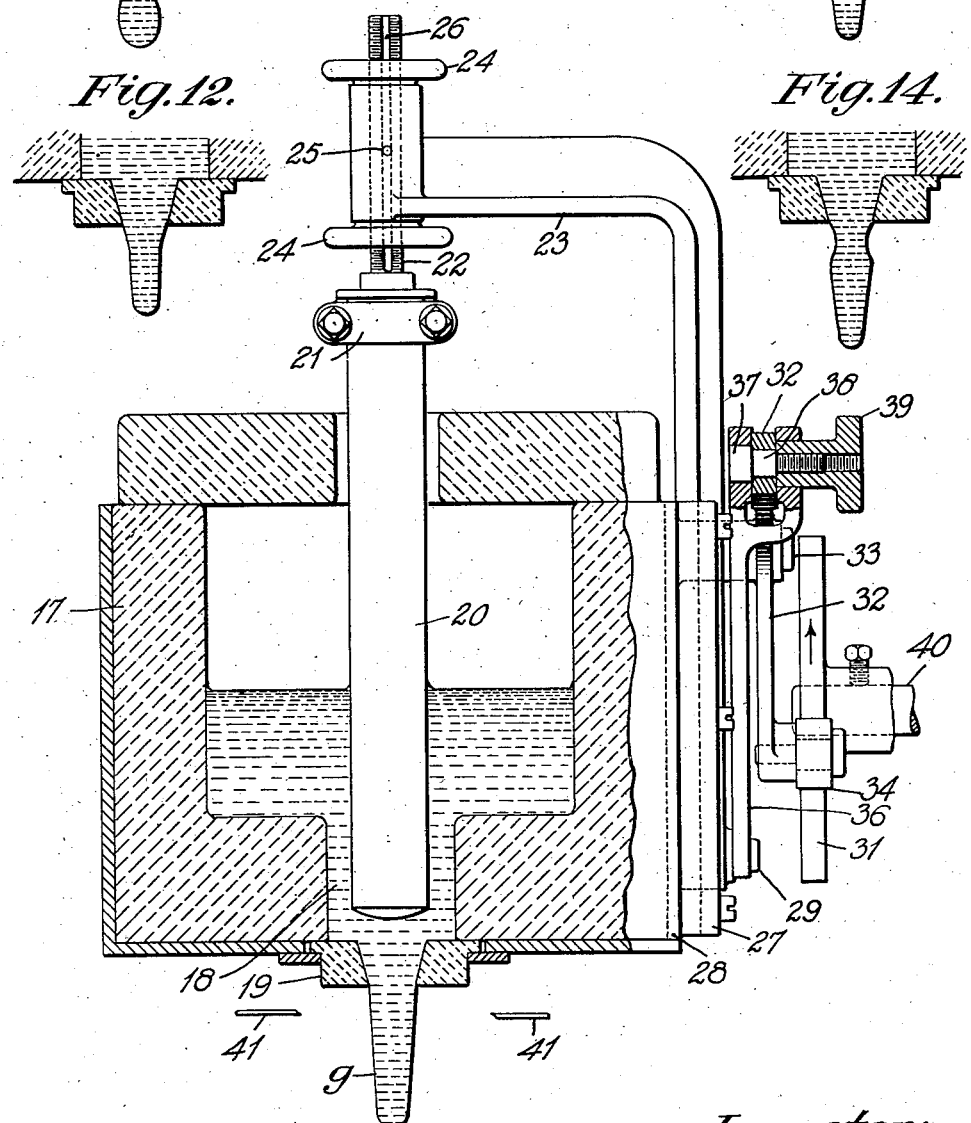
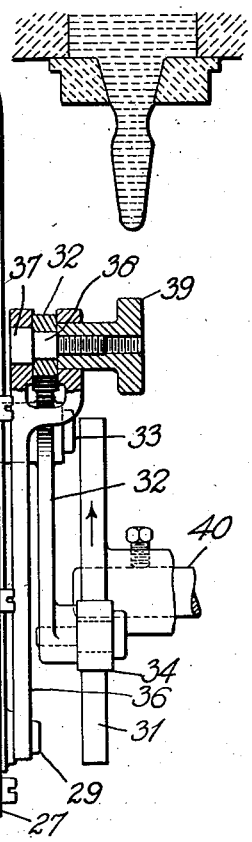
Inventor:
Karl E. Peiler
by [signature]
Atty.

Patented May 30, 1933

1,911,529

UNITED STATES PATENT OFFICE

KARL E. PEILER, OF WEST HARTFORD, CONNECTICUT, ASSIGNOR, BY MESNE ASSIGN-
MENTS, TO HARTFORD-EMPIRE COMPANY, OF HARTFORD, CONNECTICUT, A CORPO-
RATION OF DELAWARE

APPARATUS FOR FEEDING MOLTEN GLASS

Application filed March 14, 1922. Serial No. 543,571.

This invention relates to the art of feeding molten glass in masses of variable sizes and shapes suitable for charging the molds of a glass shaping machine, the object being to provide a new and improved apparatus for segregating and forming the glass into successive, suspended mold charges of predetermined controllable and variable size and shape.

In this invention an ultimate and continuous control of the volume of flow for regulating the size of the mold charges may be applied close to and directly associated with the regulation of the graduated and varying discharge of the glass to form gathers or mold charges of the desired shape. Both of these regulating functions may be exercised within a limited zone, over which the desired temperature control can also be exercised most effectively and uniformly. It also enables the method to be applied in practice by apparatus having a single movable implement, such as a plunger, which by its positions and movements controls both the size and the varied shaping of the resultant mold charges.

A preferred embodiment of the apparatus is illustrated in the accompanying drawings, in which:—

Figure 1 is a side elevation of the apparatus including a part of the forehearth of a glass furnace;

Fig. 2 is an elevation partly in section, looking from the left of Fig. 1;

Fig. 3 is a diagrammatic view illustrating graphically the improved method of retarding or interrupting or accelerating the flow of glass from the outlet of a container;

Figs. 4 and 5 are diagrammatic views illustrating the difference in the rate of discharge of glass from two passages of the same diameter but of different lengths;

Figs. 6 to 10 are diagrammatic views showing various adjustments of the apparatus; and Figs. 11 to 14 are elevation views illustrating some variations in shape of mold charges obtainable by use of this invention.

The principle employed in accelerating, retarding or interrupting the flow of the molten glass is illustrated in Fig. 3 by a container 12, having an outlet 13 submerged by the glass 14. A rod 15 extends centrally through the outlet 13 with an annular space around it, suited for the desired gravity flow when the rod is stationary. Downward movement of the rod will accelerate the flow and upward movement will retard the flow in proportion to the rapidity of movement, which may be made rapid enough to stop or reverse the gravity flow.

The effect of resistance to the flow through passages of different lengths is illustrated in Figs. 4 and 5, in both of which the passage is of the same diameter. The increased frictional resistance of the longer passageway to the flow of the glass will reduce the amount of glass discharged therethrough, so that in the same unit of time a longer passage will discharge a proportionately smaller amount than would be discharged through the shorter passage of Fig. 4, as indicated by the relative sizes of the gathers 10 and 11.

According to this invention these principles are combined and applied by a unitary structure in which the plunger performs the double function of regulating the volume of flow to control the size of the gathers, and of effecting their periodic discharge and suspension in the desired form or shape.

The glass is caused to flow through a permanently open annular passageway within a well surrounding a movable implement, such as a plunger, some portion of which always remains within the well, or within controlling relation to the annular passageway, and thus continuously controls the flow of glass therethrough, and also prevents or controls regurgitation of the glass through the passage while the plunger is performing its charge shaping function to be described later. The volume of flow is regulated by the flow resistance in the annular passage the length of which is varied by the positions and movements of the plunger. In general the resistance to flow is least when the passage is shortest, that is when the plunger is at or near its highest position, and is greatest when the passage is longest, that is when the plunger is at or near its lowest position. This generality is modified by the movements of the plunger, the resistance to downward flow being increased by the upward movements of the plunger, and decreased by its downward movement, since the plunger tends to carry with it the glass adhering to and adjacent to its outer surface. By proper adjustments and correlations of the movements, positions and periods of dwell of the plunger, the volume of flow of glass is regulated and varied to the desired extent.

Along with its function of controlling the size of the mold charges by regulating the volume of flow to the well, the plunger also serves as a means for controlling the shape of the mold charge by varying in a cyclic order the rate of discharge from the well through the outlet. A suspended gather of glass has a natural tendency to attenuate, due to and increasing with its weight. By varying the timing, length and rapidity of the plunger movements, they are adapted to utilize and direct that tendency, lessening the discharge and thus allowing the gather to attenuate at selected portions of its length as in Figs. 11 and 14, or counteracting and compensating for that tendency by increasing the discharge, and thus filling or swelling out all or any desired portion or portions of the length of the gather as in Figs. 12 and 13.

An important element in the proper performance of this shaping function is the continuous control of the flow resistance through the annular inflow passage, whereby not only the proper amount of glass is admitted to the well, but is there impounded, and its regurgitation through the passage prevented or controlled, so that the effects of the plunger movements, throughout their length, are controllably directed to their discharging and shape controlling function. Any regurgitation that may occur through the inflow passage, due to the plunger pressure, will be uniform for any given cycle of plunger movements, and may be compensated by allowing a corresponding increase in each inflow, by increasing the length of time that the plunger is in its higher positions.

Co-action between the movements of the plunger and of the shears is also utilized for shaping the gathers, particularly at their end portions. Arrest, retardation or retraction of the discharge from the outlet prior to severance may be made to produce a necking of any desired extent between two succeeding gathers, as illustrated in Fig. 14, thus affecting the shape of both gathers. Or by retracting the glass while the shears are cutting through the gather, the glass above the shearing plane will be lifted away from the shear blades progressively as it is released by the cutting action, thus pointing or rounding the end of the remaining stub, and thereby giving initial formation to the lower end of the succeeding gather. By continuing retraction or retardation after the shears have cut, a further influence may be exerted on the shape of the lower portion of the succeeding gather. These and other results desirable in practice may be obtained by suitable adjustments and correlations of the timing and movements of the plunger and shears.

After the severance, the stub may be drawn upwardly more or less to or into the outlet or well to reheat or knead or otherwise shape or reshape the end of the stub, as may be desirable for the end of the succeeding mold charge. The time and extent of this retraction is determined by the upward movements of the plunger. If the plunger is moved up rapidly before the inflowing glass from above has time to flow down past the plunger, and thus occupy the space below the plunger, the stub will be drawn up farther into the outlet or well.

A practical embodiment of the apparatus for carrying out these methods, may be incorporated with any suitable container for molten glass such, for example, as a forehearth 17 connected with the usual glass melting tank. The bottom of the forehearth is provided with a well 18, the lower end of which is partly closed by an outlet ring 19 forming a discharge outlet from which the gathers of glass are suspended for the severance of the mold charges. A plunger 20 projects through the glass in the forehearth into the well 18 and mechanism is provided for reciprocating the plunger toward and from the discharge outlet, so that its end acts within the well, as a piston, of which the viscous glass serves as a packing. The movement of the plunger is such that its lower end always remains within the well to retain its control of the flow, and does not in normal operation approach the outlet ring 19 sufficiently close to operate as a plug or stopper to throttle the discharge of glass through the outlet. This provides a unified and continuous control over the movements of the glass into and out of the well.

Mechanism is shown in the drawings, for actuating the plunger 20, which is secured by a clamp 21 to the lower end of a screw 22 sliding through a hole in the hub of a bracket 23. The plunger may be adjusted relative to the bracket and the forehearth, by hand nuts 24 engaging the screw above and below the hub of the bracket. The screw is held from rotation when the hand nuts are turned, by a pin 25 engaging a spline 26 in the screw. The bracket 23 is slidably mounted in vertical ways 27 attached to the casing 28 of the forehearth. The bracket and its plunger are reciprocated vertically by a cam 31 through connections comprising a bell crank 32 mounted on a fixed stud 33 and having a roll 34 engaging the cam. The horizontal arm of the bell crank is slotted at 35 and adjustably connected with a link 36 pivotally mounted on the bracket 23 by a stud 29. The connection between the link 36 and the bell crank comprises a stud 37 having a square central portion 38 slidable in the slot 35 and a threaded portion which receives a hand wheel 39 by which the stud may be clamped on the bell crank. The link 36 is forked and embraces the slotted arm of the bell crank, one side of the fork being pivoted on the head of the stud 37 and the other on the hub of the hand wheel 39. By this construction the connection between the link and the bell crank may be adjusted toward or from the pivot of the crank, while the machine continues in operation, thus varying the effective leverage and therefore the length of stroke of the plunger.

In order that the length of stroke of the plunger may be changed without changing its lowest position, the slot 35 is preferably an arc, having its center at 29 when the plunger is down.

The cam 31 is removably mounted on the driving shaft 40 so that it may be replaced by other cams for varying the plunger movements to suit different sizes and shapes of mold charges. A different cam may be used for any different size and shape of mold charge, the contour of each cam being adapted to impart the required cycle of movements and dwell to the plunger.

Any well-known form of severing means may be employed for severing the mold charges in timed relation to their formation. Shear blades, such as 41, shown in the drawings, may be operated through suitable connections with cams or other actuating means on or driven by the shaft 40.

The several steps in the method will be best understood from an inspection of Figs. 6 to 10. In Fig. 6 the extreme positions of the plunger are shown by full and broken lines indicating a stroke having a length $x$, and the minimum distance between the top of the well and the upper limit of the plunger stroke is indicated by $y$. A plunger movement of the length $x$ and the frictional resistance offered to the flow of glass by the flow resisting passage of the minimum length $y$ produces a gather of a certain size and shape which may be assumed to be that shown at $g$ (Fig. 2). The retardation, cessation or retraction of the discharge of glass at the outlet is produced by the upstroke of the plunger, which also affects the flow of glass through the annular passage surrounding the plunger, as determined by the relative proportions of the parts and speed of the plunger movements.

A heavier mold charge may be obtained by adjusting the hand wheels 24 so that the plunger operates in a higher zone, as shown in Fig. 7. Here the length of plunger stroke $x$ remains the same but the minimum length $y$ of the annular passage has been reduced, so as to offer less resistance to the flow of glass and thereby permit a more rapid flow through the passage and hence a heavier gather in the same period of time.

An adjustment for producing a lighter mold charge as compared with Fig. 6, is shown in Fig. 8 where the hand wheel 24 has been adjusted to lower the zone of reciprocation of the plunger. This lengthens the distance $y$, thereby reducing the rate of flow of the glass, while the length $x$ of the plunger stroke remains constant.

A lighter mold charge may be produced also by the adjustment of Fig. 9, in which the length $x$ of the plunger movement has been reduced by adjustment of the link 36 in the slot 35 (Fig. 1). This increases the length $y$ of the annular passage and the combined result is a lighter charge than in Fig. 6 but of a different shape from that produced by the adjustment of Fig. 8.

The adjustment shown in Fig. 10 produces a heavier mold charge than that of Fig. 6. In this figure the shortened flow passage $y$ permits a greater flow of the glass, while the longer plunger stroke $x$ produces a larger displacement or piston effect.

For greater convenience and definiteness in making the adjustments, it is found desirable to change the shape of the mold charges mainly by changing the length $x$ of the plunger stroke, and to change their size mainly by the height adjustment by the hand wheels 24.

In the embodiment of this invention herein shown and described, the annular passage between the plunger and the well is regarded as the flow resisting passage, since the flow resistance of that passage exceeds the flow resistance in the well below the plunger so greatly that the latter resistance may be disregarded for all practical purposes.

The dimensions of the plunger, well and orifice should, within reasonable limits, be proportioned and adapted to each other, and to the size and shape of the desired mold charge. Any particular embodiment may by the adjustments above described be changed to produce a fairly wide range of sizes and shapes, but as in other apparatus for feeding glass, it is not expected that any single embodiment will be capable of producing all sizes and shapes.

The sizes and proportions of the well and orifice ring may be changed by the use of removable and interchangeable outlet rings, and bushings of different sizes and lengths, as indicated by the bushings in Figs. 4 and 5. Plungers of different sizes may be substituted by disconnecting the bracket 23 from its connections with the link 36, and lifting it out of its slideway.

The well and plunger are herein shown to be cylindrical, since this form allows the plunger stroke to be extended indefinitely without affecting the cross sectional area of the flow passage. The well or the plunger, or both of them, may, however, be tapered or flared within limits which permit the plunger to perform its functions described above without losing constant control of the flow resisting capacity of its surrounding annular passage, and thereby or in any other way losing or lessening constant control of the discharge through the outlet, with consequent loss or lessening of control of the shape of the gathers.

Any well-known means, such as an adjustable gate or plug, may be employed for regulating the flow of the molten glass into the container here shown from the melting furnace or other source of supply, thereby varying the depth and consequent hydrostatic head of the glass above the well and outlet.

In other ways within the knowledge and skill of those practiced in this art, the embodiment herein shown may be modified within the spirit and scope of the appended claims.

I claim:—

1. Apparatus for feeding molten glass for mold charges, having in combination a container for the glass provided with a submerged well terminating in a permanently open discharge outlet, a plunger projecting constantly into the well and spaced from the walls thereof to provide an annular passageway therethrough having substantially the same cross sectional area at all positions of the plunger, and means for periodically lifting the plunger to retard the flow of glass to the discharge outlet.

2. Apparatus for separating molten glass into mold charges, having in combination a container for the glass provided with a submerged well terminating in a discharge outlet, a plunger projecting constantly into the well and spaced from the walls thereof to provide an annular passageway therethrough, having substantially the same cross sectional area in all positions of the plunger, means for periodically lifting the plunger to retard the flow of glass to the discharge outlet, and means for adjusting the extent of the lifting movement of the plunger while its lower position remains constant.

3. Apparatus for separating molten glass into mold charges, having in combination a container for the glass provided with a submerged well terminating in a discharge outlet, a plunger projecting constantly into the well and spaced from the walls thereof, means for reciprocating the plunger within the well without constricting the effective opening therethrough, and means for adjusting the path of reciprocation of the plunger, by lengthening or shortening the upped end of its path.

4. Apparatus for separating molten glass into mold charges including in combination a container for the glass having a submerged well terminating in a discharge outlet, a plunger projecting constantly into the well and spaced from the walls thereof to form an annular passage of constant cross area, means for reciprocating the plunger within the well while maintaining the cross area of the passage, and means for adjusting the path of reciprocation of the plunger.

5. Apparatus for separating molten glass into mold charges including in combination a container for the glass having a submerged well terminating in a discharge outlet, a plunger projecting constantly into the well and spaced therefrom to form an annular passageway of constant cross area in the well, an adjustable carriage for supporting and reciprocating the plunger, and means for imparting a variable rate of motion to the carriage to cause the plunger to discharge mold charges of predetermined shape and weight from the outlet.

6. Apparatus for separating molten glass into mold charges, having in combination a container for the glass provided with a submerged cylindrical well, a plunger having a cylindrical portion projecting constantly into the well, means for reciprocating said plunger at a speed varying during each reciprocation, and means for adjusting the path of travel of the lower end of the plunger between a fixed low level and variable upper levels within the well, whereby mold charges of glass having predetermined shape and weight are discharged from the outlet in the well.

7. Apparatus for feeding molten glass comprising a container for the glass having a vertical discharge well communicating at its lower end with an outlet of smaller diameter than said well, a vertical plunger having a vertical-sided lower end projecting permanently into said well and spaced from the walls thereof, means for vertically reciprocating said plunger, means for varying the timing. length and rapidity of the reciprocations of said plunger, means for varying the vertical position of said plunger with respect to said well, and shears meeting periodically beneath said outlet in timed relation to the movements of said plunger, for severing mold charges from the glass discharged from said outlet.

Signed at Hartford, Connecticut, this 10th day of March, 1922.

KARL E. PEILER.